(12) United States Patent
Wohlrab et al.

(10) Patent No.: US 6,539,807 B1
(45) Date of Patent: Apr. 1, 2003

(54) DIFFERENTIAL PRESSURE TRANSDUCERS

(75) Inventors: Dankwart Wohlrab, Pfaffenhofen (DE); Friedrich Schwamm, Zorneding (DE)

(73) Assignee: MTU Motoren-und Turbinen-Union München GmbH, Munich (DE)

( * ) Notice: Subject to any disclaimer, the term of this patent is extended or adjusted under 35 U.S.C. 154(b) by 0 days.

(21) Appl. No.: 09/444,600

(22) Filed: Nov. 22, 1999

(30) Foreign Application Priority Data

Nov. 21, 1998 (DE) .......................... 198 53 789

(51) Int. Cl.$^7$ ................................ G01L 9/00
(52) U.S. Cl. ........................................ 73/723
(58) Field of Search ................ 73/722, 728, 744, 73/745, 746, 704, 714, 114, 54, 398, 723, 862, 727; 336/30; 173/53, 121

(56) References Cited

U.S. PATENT DOCUMENTS

| | | | | |
|---|---|---|---|---|
| 3,680,387 A | * | 8/1972 | Akeley | .......................... 73/398 |
| 4,161,886 A | * | 7/1979 | Eshelman et al. | ............. 73/722 |
| 5,004,873 A | * | 4/1991 | Schnut | ......................... 200/83 |
| 5,092,178 A | * | 3/1992 | Vanderlaan | .................... 73/745 |
| 5,407,017 A | * | 4/1995 | Wehr et al. | .................... 173/54 |
| 5,457,999 A | * | 10/1995 | Feldman | ...................... 73/704 |
| 5,971,356 A | * | 10/1999 | Offenwanger et al. | . 251/129.07 |
| 6,065,495 A | * | 5/2000 | Fong et al. | ............ 137/625.25 |

* cited by examiner

*Primary Examiner*—Max Noori
*Assistant Examiner*—Marissa Ferguson
(74) *Attorney, Agent, or Firm*—Schiff Hardin & Waite

(57) ABSTRACT

The invention pertains to differential pressure transducers for gas turbine motors, for measuring variable pressure differences within a medium or between different media. The differential pressure transducer is constructed as a linear displacement sensor according to the linear variable displacement transducer (LVDT) principle, and has a ferromagnetic core that can be moved in a translatory manner, a spring element for the set position of the core given nominal differential pressure, a primary coil and two secondary coils arranged in succession axially over the length of the stroke range of the core, and a tubular housing having a delivery connection on both sides of the stroke area of the core.

13 Claims, 1 Drawing Sheet

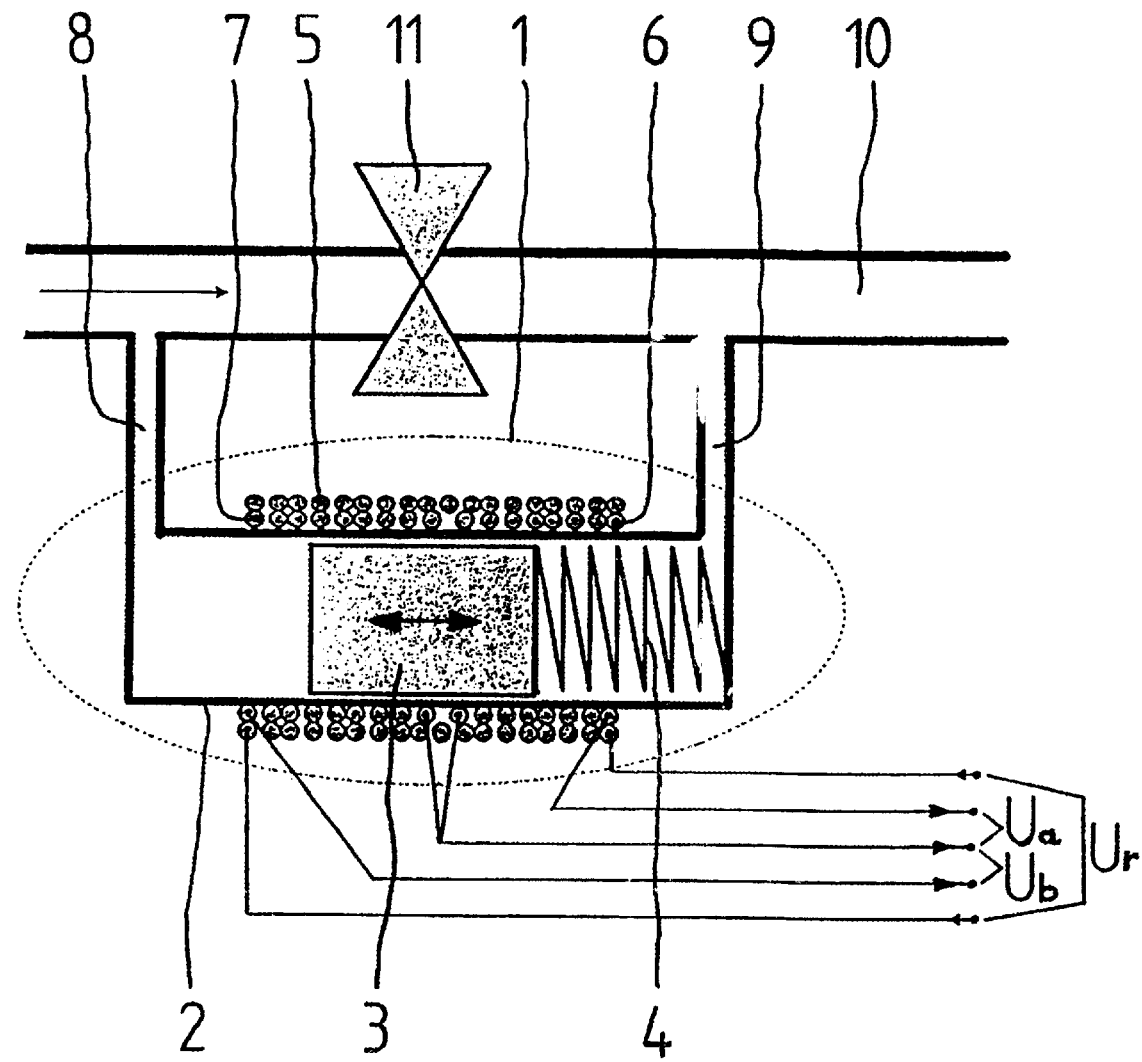

DIFFERENTIAL PRESSURE TRANSDUCERS

FIELD OF THE INVENTION

The invention relates to differential pressure transducers. More specifically, the present invention relates to differential pressure transducers for gas turbine motors.

BACKGROUND OF THE INVENTION

For purposes of monitoring or controlling driving gears driven by gas turbine motors, it is advantageous if pressure differentials can be reliably measured at specific locations, particularly in the fuel and lubricating oil systems. It is problematic to measure pressure differences with available pressure transducers, such as barometric cells, due to weight, cost and reliability factors.

The barometric cells typically consist of an evacuated vessel with an elastically deformable membrane. Variable electrical signals are generated by mechanical deformation of the membrane and an electrical change of resistors in a bridge circuit. It is possible to utilize these signals as a measure of differential pressures. However, the high fuel and oil temperatures in gas turbine motors as well as the pressure peaks in these fluids produce a very poor reliability of the barometric cells. Also, barometric cells have problems due to undetectable deformations of the critical elements (membrane, resistors). Because of these disadvantages, barometric cells have not been successfully applied in motors.

Differential pressure monitors for motors have made use of pressure-controlled electrical switches according to the yes/no principle. The yes/no electrical switches have mechanical spring elements that snap between two end positions. The switches have insufficient pressure monitoring and fail to detect the development of a differential pressure. Accordingly, the yes/no electrical switches exhibit problems in measuring and detecting pressure differentials.

For position measurement under difficult conditions, the linear variable displacement transducer (LVDT) principle is known. This is a matter of electrical position pickups or displacement sensors having an at least approximately linear dependency between a signal and a path. As is well known, these sensors are also suitable for high temperatures and heavier mechanical loads.

SUMMARY OF THE INVENTION

The present invention provides new differential pressure transducers. In particular, the present invention provides new differential pressure transducers for gas turbines driving gears, motors, or thrusters, for example. The differential pressure transducers for gas turbines measure variable pressure differences within a medium or between different mediums.

In an embodiment, a differential pressure transducer for gas turbine motors is provided for measuring variable pressure differences inside a medium or between different media, particularly for use in contact with hot media such as the fuel, the lubricating oil, and the process gas. The differential pressure transducer is implemented as a linear displacement sensor accordingly to the linear variable displacement transducer (LVDT) principle and has a piston-type core of ferromagnetic material that is bounded within a housing, can be moved axially, and being at least approximately fluid-tight. At least one spring element determines an axially set position of the core given a nominal differential pressure. The differential pressure transducer also has a primary coil having a terminal for an electrical alternating voltage in which the coil extends coaxial to the core approximately over its stroke range, and two identical secondary coils that are separately voltage-tapped, in which the coils are arranged in succession axially, extend together approximately over the length of the primary coil and being coaxial thereto. A tubular housing with a respective delivery connection on either side of the stroke area of the core is also provided.

In an embodiment of a differential pressure transducer, the primary coil and the secondary coils are arranged on the outside of the tubular housing.

In an embodiment of a differential pressure transducer, the primary coil and the secondary coils are arranged on the inside of the tubular housing, and the coils are embedded in a coil body that is itself tubular, which leads the core in its interior such that it can be moved axially.

In an embodiment of a differential pressure transducer, there is a parallel connection, in terms of flow, to a line having a fixed or displaceable choke element, for example having a diaphragm or a valve, whereby a delivery connection empties into the line upstream of the choke element. Another delivery element empties into the line downstream of the choke element. The core is lead such that it is not entirely sealed in terms of fluid and has a defined leakage gap at its perimeter.

In an embodiment of a differential pressure transducer for differential pressure measurement between different media, the core is led (moved) so as to be hermetically sealed. For example, the hermetic seal may be by a roll stocking seal.

In an embodiment of a differential pressure transducer, there is a pressure spring between the core and the housing on the side of the core that is loaded by the lower operating pressure.

One advantage of the present invention is to provide differential pressure transducers for gas turbine motors that enables the continuously adjustable measuring of variable pressure differences within a medium or between different media and that also functions reliably in the long term even under the harsh conditions present in motors. The differential pressure transducers provide an electrical differential pressure signal that is substantially proportional to the differential pressure.

Other advantages and objects of the present invention will become apparent upon reading this disclosure, including the appended claims and with reference to the accompanying drawings. All of the advantages and objects of the present invention may be desired, but may not necessarily be required to practice the present invention.

BRIEF DESCRIPTION OF THE DRAWINGS

The FIGURE is a schematic illustration of a differential pressure transducer according to the principles of the present invention.

DETAILED DESCRIPTION OF THE PRESENTLY PREFERRED EMBODIMENTS

Although the present invention can be made in many different forms, the presently preferred embodiments are described in this disclosure and shown in the attached drawings. This disclosure exemplifies the principles of the present invention and does not limit the broad aspects of the invention only to the illustrated embodiments.

FIG. 1 is a schematic illustration of a differential pressure transducer according to the present invention and shows a differential pressure transducer according to the linear variable displacement transducer (LVDT) principle.

For the sake of clarity, the immediate area of the differential pressure transducer 1 is outlined in FIG. 1 by a dotted ellipse. Above this area, there is a line 10, which conducts fuel, that is, kerosine, to a gas turbine motor (not illustrated). The flow direction in the line 10 is indicated by an arrow on the left.

A choke element or throttle element 11, that is, a pressure reducing functional element, is integrated in the line 10. The choke element 11 may be a diaphragm of a fixed geometry or a control valve with a variable cross-section, for example. For purposes of controlling the turbine motor, the pressure drop across the choke element 11 should be detected in the flowing medium, and preferably in a continuously variable manner through time.

To this end, two delivery connections or pressure leads 8, 9 branch off from the line 10, one upstream and one downstream to the choke element 11. The delivery connections 8, 9 form open volumetric connections to the differential pressure transducer 1, so that the flowing medium can enter and exit the transducer. The connection geometry is selected such that practically only the static pressure components of the medium or mediums in the line 10 become effective in the differential pressure transducer 1.

In a tubular housing 2 having a preferably circular cylindrical inner cross-section, a piston-type core 3 made of ferromagnetic material is led such that it can be moved axially. Because in the given example, the same medium is located on both sides of the core 3, the guiding/fit in the housing 2 need not be entirely sealed in terms of the medium. A small defined leakage flow via the outer perimeter of the core 3 acts "as a lubricant", that is, to reduce friction. Thus, the leakage may be desirable as long as it remains negligibly small in relation to the actual flow through the line 10. If the differential pressure transducer 1 is arranged between different media that may not be mixed, then of course the leading (movement) of the core 3 must be such as to be sealed, whereby low friction plays an important role. What are known as rolled stocking seals can be used to seal the core 3 relative to the housing 2, for example.

On the side of a lower pressure in the line 10, the core 3 is braced at the housing 2 via a pressure spring 4. The characteristics of the pressure spring 4 are selected such that when there is a pending nominal or rated differential pressure, the core 3 is situated in its axially central set position or rated position. If the pressure differential deviates from the nominal value, the core 3 moves axially, that is, to the right or left, until a balance again prevails between the pressure force (differential pressure×frontal area) and the spring power.

On the exterior of the housing 2 three coils 5, 6, and 7 are arranged. The coils 5, 6, and 7 convert the axial movements of the core 3 into electrical measuring signals. A primary coil 5 extends axially approximately over the entire stroke range of the core 3. The primary coil 5 is charged with an alternating voltage/ reference voltage Ur during operation and thus, generates an electromagnetic alternating field that should cover/permeate the stroke range of the core 3. The housing 2 should consist of a material that minimally influences the magnetic field lines, for instance plastic. Two identical secondary coils 6, 7 are arranged in succession coaxial to the primary coil 5, which extend together approximately over the same axial length as the primary coil 5. The alternating voltage Ur generates secondary voltages Ua, Ub in the secondary coils 6, 7 with the same frequency according to the transformer principle, which voltages are used as measuring signals. The ferromagnetic core 3 influences the spatial characteristics (direction, distribution, density, etc.) of the magnetic field lines. Depending on the axial position of the core 3, the magnetic field is either distributed to both secondary coils 6, 7 evenly or is concentrated more on one of the two secondary coils 6, 7. The coil with the stronger field concentration then delivers a higher induced voltage. For the overall stroke range of the core 3, the relation $(\Delta p - \Delta pN) \sim (Ua - Ub) \div (Ua + Ub)$ at least approximately applies, whereby $(Up + Ub) \approx$ constant.

Put into words, the difference between the actual differential pressure ($\Delta p$) and the nominal differential pressure ($\Delta pN$) is proportional to the quotient of the difference of the secondary voltages and the sum of the secondary voltages, the latter being approximately constant. Thus, the difference of the secondary voltages is ultimately a measure of the change of the differential pressure compared to the nominal differential pressure. There is a good approximation of a linear relation between the electrical measuring signal (Ua−Ub) and the axial excursion of the core 3 from its set position. When the voltage Ua increases relative to Ub, it means that the core 3 has wandered further to the right; that is, the pressure difference from left to right has grown larger. Accordingly, it is possible to derive from the "operational sign" (+,−) of the difference Ua−Ub whether there is an increase or a decrease of the pressure differential.

While the secondary coils 6 and 7 are illustrated as being telescoped within the primary coil 5 and arranged outside of the tubular housing 2, it should be noted that the coils 5, 6, and 7, like the core 3, can also be arranged inside the tubular housing 2. The coils 5, 6, and 7 can be suitably embedded in an electrically insulating carrier material such that a likewise tubular coil body is provided in which the ferromagnetic core is directly led. An advantage of this "inner coil arrangement" is that the housing 2 can also consist of ferromagnetic material, for instance steel. The electrical leading of the coil terminals through the housing wall may need to be sealed.

While the presently preferred embodiments have been illustrated and described, numerous changes and modifications can be made without significantly departing from the spirit and scope and this invention. Therefore, the inventors intend that such changes and modifications are covered by the appended claims.

The invention is claimed as:

1. A differential pressure transducer for measuring a pressure differential at different points in a medium, said transducer comprising:

a tubular housing having spaced apart first and second medium connections;

a piston core having end faces being positioned axially movable within the tubular housing between the first and second medium connections, said core being of a ferromagnetic material and having a stroke range;

means for creating a set position given a nominal differential pressure on either end face of the piston core;

a primary coil having terminals for an alternating voltage extending coaxially to the piston core and having a length of the stroke range; and at least two secondary coils being telescopically arranged in succession axially, and coaxial to the primary coil, said secondary coils having separate voltage taps so that a differential pressure can be determined from the separate voltages created in the two secondary coils.

2. A differential pressure transducer according to claim 1, wherein the first and second medium connections are connected to a line having a choke element with the first medium connection being connected upstream of the choke element and the second medium connection being connected downstream of the choke element.

3. A differential pressure transducer according to claim 2, wherein the piston has a loose fit within the tubular housing, so that a leakage gap extends between the housing and the piston.

4. A differential pressure transducer according to claim 2, wherein the piston has a seal between the outer wall of the piston and the tubular housing.

5. A differential pressure transducer according to claim 2, wherein the choke element is selected from a valve and a diaphragm with an opening.

6. A differential pressure transducer according to claim 1, wherein the primary coil and the two secondary coils are on the outside of the tubular housing.

7. A differential pressure transducer according to claim 1, wherein the tubular housing has a second tubular member, said secondary coils and primary coils being embedded in said secondary member within the tubular housing with the piston being disposed within the second tubular housing.

8. A differential pressure transducer according to claim 1, wherein the means for creating a set position comprises a spring element extending between one end of the housing and the piston.

9. A differential pressure transducer according to claim 6, wherein the first and second medium connections are connected on opposite sides of a choke element of a line containing the medium with the first medium connection being on the upstream side of the choke element and the second medium connection being to the downstream side of the choke element.

10. A differential pressure transducer according to claim 9, wherein the choke element is selected from a diaphragm with an opening and a valve.

11. A differential pressure transducer according to claim 9, wherein the piston core has a leakage gap between the outer surface of the core and the interior of the tubular housing.

12. A differential pressure transducer according to claim 9, wherein the piston has a seal between the outer surface of the piston and the interior of the tubular housing so that it is hermetically sealed therein.

13. A method for measuring a pressure differential between two spaced points in a medium, said method comprising providing a tubular housing containing a piston having a first side and a second side, supplying a first pressure to a first side of the piston and a second pressure to the second side of the piston, applying an alternating voltage to a primary coil extending coaxially along the tubular housing, measuring the generated signals from two supplemental coils coaxially and telescopically positioned relative to the housing and the primary coil and using the generated signal to determine the pressure differential acting on the piston.

* * * * *